United States Patent Office 3,342,837
Patented Sept. 19, 1967

3,342,837
2 - SUBSTITUTED - 2 - METHYL - 3 - HYDROXY-5,6-DICHLORO - 1 - PHTHALANONES AND THEIR METHOD OF PREPARATION
Wen-Hsuan Chang, Gibsonia, Pa., assignor to Pittsburgh Plate Glass Company, Pittsburgh, Pa., a corporation of Pennsylvania
No Drawing. Filed Mar. 17, 1965, Ser. No. 440,642
15 Claims. (Cl. 260—343.3)

This invention relates to 2-methyl-2-alkoxy-3-hydroxy-5,6-dichloro-1-phthalanones and their preparation. More particularly, this invention relates to the reaction of 2-acetyl-3-hydroxy-4,5,6-trichlorotropone with compounds containing primary hydroxyl groups and the products of this reaction.

2-acetyl-3-hydroxy-4,5,6-trichlorotropone may be prepared by the reaction of tetrachloro-o-benzoquinone with acetone. This reaction is described in the literature, i.e. Schenk et al., Angewante Chemie, volume 68, pages 247–248 (1956). Schenk et al. disclose the structure of the product as 2-hydroxy-3-acetyl-5,6,7-trichloro-2,4,6-cycloheptatriene - 1 - one or 3-acetyl-4,5,6-trichlorotropolone. However, it has now been determined that the structure of Schenk et al. is erroneous, and the compound which is the reaction product of the reaction described by Schenk et al. and which constitutes the starting material in the instant invention is, in fact, 2-acetyl-3-hydroxy-4 (or 7), 5, 6-trichlorotropone existing in the tautomeric form:

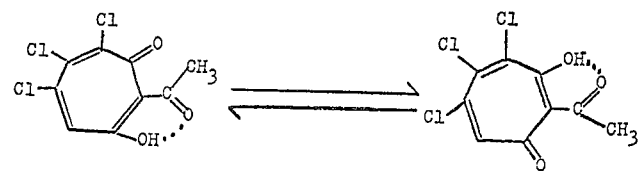

The primary hydroxyl-containing compound may be any primary alcohol which is free from functional groups which would alter the course of the desired reaction. Preferably, the primary alcohols contain 1 to 12 carbon atoms. For example, the primary hydroxy-containing compound may be a saturated (i.e. free from non-benzenoidal unsaturation) or olefinically unsaturated hydrocarbyl primary alcohol.

Preferably the primary alcohol is an alkanol having 1 to 12 carbon atoms. Other primary hydrocarbyl alcohols include aryl substituted alkanols such as benzyl alcohol, alkenols, such as allyl alcohol, aryl substituted alkenols such as cinnamic alcohol, alicyclic substituted alkanols such as hexahydrobenzyl alcohol and alicyclic substituted alkenols such as 4-cyclohexyl-2-buten-1-ol.

Other primary alcohols which may be utilized to produce the products of this invention include the ether and ester substituted primary hydrocarbyl alcohols. Examples of these compounds include alkoxyalkanols such as 2-ethoxy-1-ethanol, alkoxyalkenols such as 4-ethoxy-2-buten-1-ol, aryloxyalkanols such as 2-phenoxyethan-1-ol, aryloxyalkenols such as 4-phenoxy-2-buten-1-ol, arylalkoxyalkanols such as 2-(phenylmethoxy)ethan-1-ol, alkanoyloxyalkanols such as 2-hydroxyethyl acetate, alkenoyloxyalkenols such as 2-hydroxy-ethyl acrylate, alkanoyloxyalkenols such as 4-hydroxy-2-buten-1-yl acetate, benzoyloxyalkanols such as 2-hydroxy-ethyl benzoate, and benzoyloxyalkenols such as 4-hydroxy-2-buten-1-yl benzoate.

Compounds containing more than one alcoholic hydroxy group may also be utilized in preparing the compounds of this invention. For example, alkandiols such as propylene glycol, alkendiols such as 2-buten-1,4-diol and alkantriols such as 1,5,6-hexanetriol may be utilized as starting materials in producing the products of this invention.

In addition to the primary alcohols set forth above, the chlorine, fluorine, and bromine substituted derivatives of the above alcohols may also be utilized in preparing the compounds of this invention. Such compounds include, for example, 2-fluoroethanol, 6-chlorohexanol-1, 2,2,3-trichlorobutanol-1, 2-chloropropanediol, 3-chloro-2-penten - 1 - ol, 2-(beta-chloroethoxy)ethanol, beta-hydroxyethyl dichloroacetate, o-chlorobenzyl alcohol, o-bromobenzyl alcohol, 2-hydroxyethyl p-chlorobenzoate, and beta-bromocinnamic alcohol.

The compounds of the instant invention correspond to the formula:

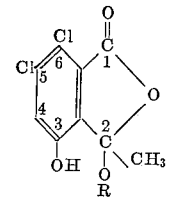

where R represents an organic radical derived by removing the hydrogen atom from a primary hydroxyl group of a primary alcohol. Preferably the primary alcohol is selected from the group consisting of alkanols, alkenols, arylalkanols, arylalkenols, cycloalkylalkanols, cycloalkylalkenols, alkoxyalkanols, alkoxyalkenols, aryloxyalkanols, arylalkoxyalkanols, alkanoyloxyalkanols, alkenoyloxyalkanols, alkanoyloxyalkenols, benzoyloxyalkanols, benzoyloxyalkenols, alkandiols, alkendiols, and alkantriols, and their chlorine, bromine and fluorine substituted derivatives. More preferably, R is derived from a primary alkanol. Preferably R contains less than 13 carbon atoms.

The reaction conditions employed to produce the products of this invention may vary widely. For example, the reaction can be carried out at ordinary room temperature (about 25° C.), although somewhat elevated temperatures, up to about 150° C. or higher, may be used to induce faster rates of reaction. Preferably the reaction is carried out between about 60° C. and about 150° C., depending upon the reactivity and stability of the particular reactants and products involved in the reaction. The reaction in many cases may conveniently be carried out at the reflux temperature of the system. The reaction proceeds in the absence of any added catalyst. The proportions of the reactants likewise may be varied widely. However, in order to assure a good yield of the desired product an excess of the primary alcohol may be employed in order to reduce or eliminate undesirable side reactions which may reduce the yield of the desired product. In addition to promoting the reaction, such excess alcohol also serves as a solvent or diluent for the reaction mixture. The reaction may also be carried out in the presence of an insert solvent or diluent such as benzene, toluene or ethers.

The compounds of the invention may be recovered from the reaction mixture by conventional techniques known to the organic chemist. In some instances, the products crystalize out of solution and may be purified by recrystallization with appropriate solvents. When a solvent is used in which the desired product is soluble, removal of the solvent by evaporation or vacuum distillation may be used to isolate the product. This product may then be recrystallized, if desired. Where the reaction mixture is liquid or a low melting solid, the product may be isolated by vacuum distillation of combined distillation and recrystallization. Other techniques such as solvent extraction and chromatography may also be employed to isolate the products of this invention.

There are set forth below several examples which illustrate the method of producing the compounds of this invention and the manner in which such compounds were isolated and identified. These examples are, of course, givn by way of illustration only and should not be construed as limitig the invention to the particular details thereof. All parts and percentages set forth, as is true throughout this specification, are by weight unless otherwise specified.

EXAMPLE I

2-acetyl-3-hydroxy-4,5,6-trichlorotropone

To a 150 milliliter Erlenmeyer flask there was added 5 grams of tetrachloro-o-benzoquinone, 25 milliliters of acetone, 1 milliliter of acetic acid and 5 milliliters of water. The solution was kept at room temperature overnight. The volatile material was then removed at room temperature in vacuo. The residue was in two layers. The top layer was essentially water and was removed by decantation. The red oily residue was treated with hexane. Filtration and crystallization produced 5 grams of crystals, melting point 107° C.–118° C. The product was recrystallized from ether-hexane; yield 4.0 grams, melting point 117° C.–119° C. (with decomposition).

EXAMPLE II

2-methyl-2-ethoxy-3-hydroxy-5,6-dichloro-1-phthalanone

A solution of 5 grams of 2-acetyl-3-hydroxy-4,5,6-trichlorotropone and 8 grams of absolute ethanol was refluxed for 3 hours. The reaction product was put in an open beaker for 36 hours, during which time the solvent evaporated and a solid material remained. This solid was washed with ether-hexane. This material charred at 200° C. without melting. This product was dissolved in acetone and was crystallized by the addition of ligroin (boiling point 85° C.–100° C.). The crystals were again recrystallized from ether-hexane to give a material which, when heated slowly, did not melt but sintered at 163.5° C. and changed to an orange color. When heated more rapidly (about 1° C. per minute), this product melted at about 163.5° C., with decomposition, and then resolidified.

*Analysis.*—Calculated for $C_{11}H_{10}Cl_2O_4$. C, 47.68%; H, 3.64%; Cl, 25.59%. Found: C, 47.62%; H, 3.41%; Cl, 26.67%.

The absorption bands of the infrared spectrum of this compound in Nujol Mull are 3.17, 3.43, 3.51, 3.86, 6.20, 6.23, 6.78, 6.84, 7.02, 7.30, 7.60, 7.71, 8.08, 8.38, 9.38, 9.66, 9.76, 11.08, 11.39, 11.94, 12.53, 12.77, 13.98 and 14.30 microns.

The monobenzoate of this compound was prepared with ease from benzoyl chloride and pyridine according to the conventional procedure. After recrystallization from ether-methanol, a quantitative yield of the product was obtained. Melting point 146° C.–148° C.

*Analysis.*—Calculated for $C_{18}H_{14}Cl_2O_5$. C, 56.71%; H, 3.71%; Cl, 18.60%. Found: C, 56.84%; H, 3.81%; Cl, 19.34%.

EXAMPLE III

2-methyl-2-methoxy-3-hydroxy-5,6-dichloro-1-phthalanone

A solution of 5.0 grams of 2-acetyl-3-hydroxy-4,5,6-trichlorotropone and 8 grams of methanol was refluxed in a round bottom flask for 1.5 hours. The crystalline product precipitated out of the boiling solution. The reaction product was cooled and the solid collected by filtration. This compound turned light brown at 240° C. and darkened at higher temperatures, but was not melted when heated up to 320° C.

*Analysis.*—Calculated for $C_{10}H_{18}Cl_2O_4$. C, 45.65%; H, 3.06%; Cl, 26.95%. Found: C, 45.49%; H, 3.04%; Cl, 27.10%.

The absorption bands of the infrared spectrum of this compound in Nujol Mull were very similar to that of the ethanol derivative of Example I except for some minor shifts. Thus, instead of having absorption bands of 8.38, 11.39 and 12.51 microns, this compound had absorption bands at 8.31, 11.43 and 13.53 microns.

The benzoate of the product could be prepared with benzoyl chloride and pyridine with ease. The benzoate was recrystallized from ether-hexane and had a melting point of 170° C.–171° C.

EXAMPLE IV

2-methyl-2-butoxy-3-hydroxy-5,6-dichloro-1-phthalanone

A solution of 5 grams of 2-acetyl-3-hydroxy-4,5,6-trichlorotropone and 12 grams of n-butanol was refluxed for 3 hours. The reaction product was evaporated in vacuo to dryness. To the residue hexane was added and the mixture filtered. The solid isolated and melted at 170° C. but then resolidified at about 180° C. and did not completely melt again even at 270° C. Recrystallization from ether-hexane gave a product with a melting point of 163° C.–165° C.

*Analysis.*—Calculated for $C_{13}H_{14}Cl_2O_4$: C, 51.17%; H, 4.62%; Cl, 23.24%. Found: C, 51.22%; H, 4.75%; Cl, 23.21%.

The absorption bands of the infrared spectrum of this compound in Nujol Mull were 3.29, 3.42 (wide), 5.80, 6.24, 6.26, 6.95 (wide), 7.11, 7.63, 7.74, 8.12, 8.40, 9.30, 9.60, 9.70, 9.81, 10.06, 11.20, 11.45, 11.70, 11.92, 12.12, 12.52, 12.78, 13.90, and 14.30 microns. The absorption in the ultraviolet spectrum in a 0.2089 gram/milliliter isopropanol solution are peaks: 3200 A. (log $E=3.60$); 2090 A. (log $E=4.60$); and 2230 A. (log $E=4.41$).

While the foregoing examples show the use of alkanols; it is within the scope of this invention to employ any primary alcohol, preferably one containing less than 13 carbon atoms. Where an alkenol is employed, for example, allyl alcohol, the corresponding compound would be 2-methyl-2-allyloxy-3-hydroxy-5,6-dichloro-1-phthalanone. Likewise, where an aralkanol is employed, for example, benzyl alcohol, the corresponding compound would be 2-methyl-2-benzyloxy-3-hydroxy-5,6-dichloro-1-phthalanone.

The compounds of this invention are useful as chemical intermediates in the preparation of pharmaceuticals and pesticides. The compounds of this invention also find utility as antioxidants or ultraviolet light stabilizers for hydrocarbon materials such as polyethylene and polypropylene, alone or in combination with other known stabilizers and as polymerization inhibitors for compounds such as vinyl chloride and methyl methacrylate. Further, one mole of the compounds of this invention can be reacted with two moles of sodium hydroxide at 100° C. for 2–3 hours after which time one mole of monochloroacetic acid is added and the mixture heated for an additional 2–3 hours. Upon acidification, a dicarboxylic acid is produced; which dicarboxylic acid may be reacted with a polyol such as ethylene glycol or propylene glycol to produce a polyester. The compounds of this invention may also be reacted with phenol in the pressure of H₂SO₄ to produce compounds which find utility as antioxidants or as resin intermediates.

Although specific examples of the invention have been set forth, it is not intended to limit the invention solely thereto, but to include all of the variations and modifications falling within the scope of the appended claims.

What is claimed is:

1. A compound corresponding to the formula:

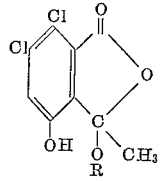

where OR represents an organic radical derived by removing the hydrogen atom from the primary hydroxyl group of a primary alcohol selected from the group consisting of unsubstituted alkanols containing less than 13 carbon atoms, allyl alcohol, benzyl alcohol, cinnamic alcohol, hexahydrobenzyl alcohol, 4-cyclohexyl-2-buten-1-ol, 2-ethoxy-1-ethanol, 4-ethoxy-2-buten-1-ol, 2-phenoxyethane-1-ol, 4-phenoxy-2-buten-1-ol, 2(phenylmethoxy)ethane-1-ol, 2-hydroxyethyl acetate, 2-hydroxyethyl acetate, 4-hydroxy-2-buten-1-yl acetate, 2-hydroxyethyl benzoate, 4-hydroxy-2-buten-1-yl benzoate, propylene glycol, 2-buten-1,4-diol, 1,5,6-hexanetriol, 2-fluoroethanol, 6-chlorohexanol-1, 2,2,3-trichlorobutanol-1, 2-chloropropandiol, 3-chloro-2-penten-1-ol, 2(beta-chloroethoxy)ethanol, beta-hydroxyethyl dichloroacetate, o-chlorobenzyl alcohol, o-bromobenzyl alcohol, 2-hydroxyethyl p-chlorobenzoate, and beta-bromocinnamic alcohol.

2. A compound of claim 1 wherein the primary alcohol is selected from the group consisting of unsubstituted alkanols containing less than 13 carbon atoms, allyl alcohol and benzyl alcohol.

3. A method which comprises reacting 2-acetyl-3-hydroxy-4,5,6-trichlorotropone with a primary alcohol which is selected from the group consisting of unsubstituted alkanols containing less than 13 carbon atoms, allyl alcohol, benzyl alcohol, cinnamic alcohol, hexahydrobenzyl alcohol, 4-cyclohexyl-2-buten-1-ol, 2-ethoxy-1-ethanol, 4-ethoxy-2-buten-1-ol, 2-phenoxyethane-1-ol, 4-phenoxy-2-buten-1-ol, 2(phenylmethoxy)ethane-1-ol, 2-hydroxyethyl acetate, 2-hydroxyethyl acrylate, 4-hydroxy-2-buten-1-yl acetate, 2-hydroxyethyl benzoate, 4-hydroxy-2-buten-1-yl benzoate, propylene glycol, 2-buten-1,4-diol, 1,5,6-hexanetriol, 2-fluoroethanol, 6-chlorohexanol-1, 2,2,3-trichlorobutanol-1, 2-chloropropanediol, 3-chloro-2-penten-1-ol, 2(beta-chloroethoxy)ethanol, beta-hydroxyethyl dichloroacetate, o-chlorobenzyl alcohol, o-bromobenzyl alcohol, 2-hydroxyethyl-p-chlorobenzoate and beta-bromocinnamic alcohol, at a temperature of from about 25° C. to about 150° C.

4. A method as in claim 3 wherein an excess of the primary alcohol is present.

5. A method as in claim 3 which comprises reacting 2-acetyl-3-hydroxy-4,5,6-trichlorotropone with a primary alcohol selected from the group consisting of unsubstituted alkanols containing less than 13 carbon atoms, allyl alcohol and benzyl alcohol, at a temperature of from about 25° C. to about 150° C.

6. A method as in claim 5 wherein an excess of the primary alcohol is present.

7. A compound as in claim 2 wherein said primary alcohol is an alkanol containing less than 13 carbon atoms.

8. A compound as in claim 2 wherein said primary alcohol is allyl alcohol.

9. A compound as in claim 2 wherein said primary alcohol is benzyl alcohol.

10. A method as in claim 4 wherein the alcohol is an alkanol.

11. A method as in claim 4 wherein the alcohol is allyl alcohol.

12. A method as in claim 4 wherein the alcohol is benzyl alcohol.

13. 2-methyl-2-methoxy-3-hydroxy - 5,6 - dichloro - 1-phehalanone.

14. 2-methyl-2-ethoxy - 3 - hydroxy - 5,6 - dichloro-1-phthalanone.

15. 2-methyl-2-butoxy-3-hydroxy-5,6-dichloro-1-phthalanone.

References Cited

UNITED STATES PATENTS 2,702,807 2/1955 Hutchings ........ 260—343.3
2,757,179 7/1956 Kushner et al. ..... 260—343.3

ALEX MAZEL, *Primary Examiner.*

J. NARCAVAGE, *Assistant Examiner.*

UNITED STATES PATENT OFFICE
CERTIFICATE OF CORRECTION

Patent No. 3,342,837                        September 19, 1967

Wen-Hsuan Chang

It is certified that error appears in the above identified patent and that said Letters Patent are hereby corrected as shown below:

Column 5, line 27, strike out "2-hydroxyethyl acetate,"; column 6, line 35, for "phehalanone" read -- phthalanone --.

Signed and sealed this 24th day of June 1969.

(SEAL)
Attest:

Edward M. Fletcher, Jr.                     WILLIAM E. SCHUYLER, JR.
Attesting Officer                              Commissioner of Patents